United States Patent
Otsuka et al.

[15] 3,686,305
[45] Aug. 22, 1972

[54] METHOD FOR SYNTHESIZING UREA

[72] Inventors: Eiji Otsuka; Kazumichi Kanai, both of Fujisawa; Shigeru Inoue, Kamakura, all of Japan

[73] Assignee: Mitsui Toatsu Chemicals, Incorporated, Tokyo, Japan

[22] Filed: Feb. 19, 1969

[21] Appl. No.: 800,550

[52] U.S. Cl.............................260/555 A, 260/534 B
[51] Int. Cl..............................................C07c 127/00
[58] Field of Search..................................260/555 A

[56] References Cited

UNITED STATES PATENTS

| | | | |
|---|---|---|---|
| 3,356,723 | 12/1967 | Kaasenbrood | 260/555 A |
| 3,317,601 | 5/1967 | Otsuka | 260/555 A |
| 3,310,376 | 3/1967 | Cook et al. | 260/555 A |
| 3,239,522 | 3/1966 | Cook et al. | 260/555 A |

*Primary Examiner*—Leon Zitver
*Assistant Examiner*—Michael W. Glynn
*Attorney*—Christen & Sabol

[57] ABSTRACT

A process for synthesizing urea comprising reacting carbon dioxide and ammonia at urea forming temperatures and pressures to produce a reaction mixture containing urea, water, unreacted ammonium carbamate, gaseous carbon dioxide and gaseous ammonia, introducing said reaction mixture into a heat recovering zone to recover excess heat of reaction thereby condensing most of said gaseous carbon dioxide and gaseous ammonia contained in reaction mixture, and further reacting the reaction mixture from said heat recovering zone to form additional urea.

14 Claims, 5 Drawing Figures

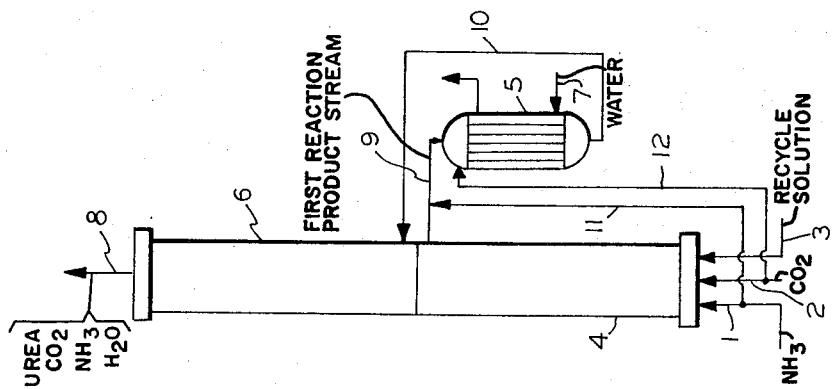
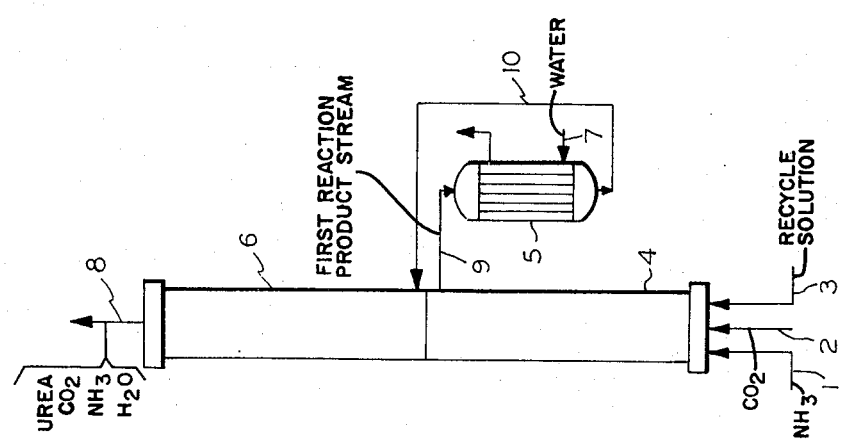
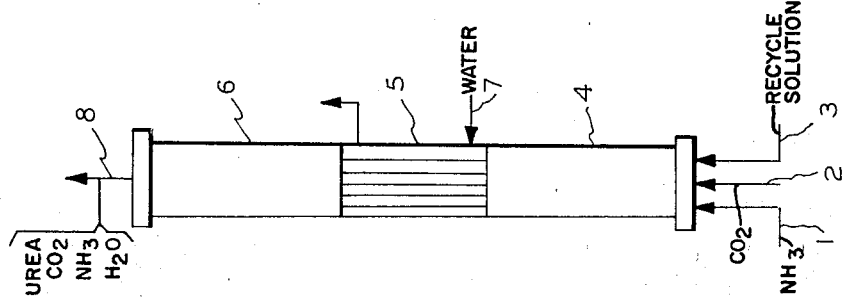

INVENTORS
EIJI OTSUKA
KAZUMICHI KANAI
SHIGERU INOUE

BY

ATTORNEYS

METHOD FOR SYNTHESIZING UREA

BACKGROUND OF THE INVENTION

1. Field Of The Invention

The present invention relates to an improvement in the process for producing urea from ammonia and carbon dioxide.

2. Description Of The Prior Art

As is generally known to those skilled in the art, the reaction for producing urea is carried out in the following two steps represented by the reaction formulas given below.

$$2NH_3 + CO_2 \rightarrow NH_4CO_2NH_2 \qquad 1$$

$$NH_4CO_2NH_2 \rightarrow NH_2CONH_2 + H_2O \qquad 2$$

The reaction represented by the formula 1 occurs at high reaction velocity but the reaction represented by the formula 2 is rather slow and in order to attain the conversion ratio close to the equilibrium, a considerably long reaction time is required.

When the equilibrium pressure of the reaction solution is taken into consideration, ammonium carbamate on the left side of the formula 2 has greater equilibrium pressure but the equilibrium pressure of the urea on the right side of the formula 2 is zero and water has relatively small equilibrium pressure, and thus, as the reaction represented by the formula 2 progresses, the equilibrium pressure of the reaction solution is reduced.

Therefore, a long cylindrical vessel is employed as the urea synthesis autoclave and, when the raw materials are introduced from the bottom thereof, the equilibrium pressure of the reaction solution reaches a minimum at the top of the synthesis autoclave and reaches a maximum at the bottom, as in all the conventional processes for producing urea.

When the pressure required for producing urea is lower than the equilibrium pressure of the reaction solution at the bottom of the synthesis autoclave, a considerably large amount of ammonia and carbon dioxide remain in the form of gas without being converted into ammonium carbamate. In particular, when the reaction pressure is lowered below the conventionally employed pressure or when the temperature of the raw materials is high, or if excessive amounts of heat should be generated in the synthesis autoclave, the above-mentioned tendency towards unreacted raw material gases becomes considerable.

These gases go up through the reaction solution of the synthesis autoclave because the specific gravities of the gases are less than that of the reaction solution, and they are removed out of the synthesis autoclave. Needless to say, a part of the gases is dissolved because the equilibrium pressure of the reaction solution is more and more reduced as it goes towards the upper portion of the synthesis autoclave but most of these gases are withdrawn from the synthesis autoclave in the form of gas. The amount of the gases withdrawn from the synthesis autoclave goes in counter proportional relation to the adopted pressure under which urea is produced.

Thus, the amount of unreacted gases withdrawn from the synthesis autoclave is unexpectedly great within the reaction pressure ranging from 200 to 250 kg/cm² (gauge) which is conventionally adopted in the synthesis of urea, and the inventors of the present invention discovered that the amount of unreacted gases withdrawn from the synthesis autoclave causes the lowering of the overall conversion ratio.

There have been proposed a number of counter measures for preventing the escape of ammonia and carbon dioxide out of the synthesis autoclave. As one of the counter measures, there is a conventional method for removing the excess calories of heat at the synthesis autoclave, according to which a cooling zone is provided at the inlet portion of the synthesis autoclave.

However, it has been found that this conventional method has the following drawbacks. When the above-mentioned conventional method is employed, excess heat cannot be perfectly removed and therefore it is impossible to prevent the escape of ammonia and carbon dioxide in the form of gases out of the synthesis autoclave. When it is desired to sufficiently remove the excess heat, the reaction temperature of the cooling zone is lowered and the conversion ratio is also lowered. In addition, to that, when steam is generated by the heat recovered, the pressure of the generated steam is low. Generally speaking, the higher the pressure of steam, the more useful it is, and therefore the above-mentioned conventional method is not very effective.

SUMMARY OF THE INVENTION

An object of the present invention is to provide a process for producing urea according to which the conversion rate is remarkably improved.

Another object of the present invention is to provide a process for synthesizing urea according to which excess calories of heat in the urea synthesis can be effectively utilized.

A further object of the present invention is to provide a process for synthesizing urea with solution recycle according to which the consumption of steam is small.

According to this invention there is provided a process for synthesizing urea wherein ammonia and carbon dioxide are reacted at a urea forming temperature and pressure in a first urea synthesizing zone to produce a stream of reaction product containing urea, water, unreacted ammonium carbamate, gaseous ammonia and gaseous carbon dioxide. The stream is introduced into a heat recovery zone to condense most of the gaseous ammonia and gaseous carbon dioxide and recover excess heat. The stream of reaction product coming from the heat recovery zone is introduced into a second urea synthesizing zone for further reaction.

In accordance with the present invention, a part of the raw materials i.e., ammonia and carbon dioxide, preferably from 10 to 50 percent by weight, may be introduced into the heat recovering zone by mixing the same along with the reaction product coming out of the first urea producing zone. When at least a part of unreacted ammonia and a part of unreacted carbon dioxide in the aqueous solution of ammonium carbamate are circulated for the synthesis of urea, said aqueous solution is introduced into the first urea synthesizing zone. When unreacted ammonia and carbon dioxide are circulated as a gaseous mixture for the synthesis of urea, the total amount thereof can be introduced into the first urea synthesizing zone or into the heat recovering zone or the total amount of the gaseous mixture can be divided and part introduced into the first urea synthesizing zone and part into the heat recovering zone. When unreacted ammonia and carbon dioxide are circulated for the synthesis of urea in the form of the aqueous solution of ammonium carbamate, the aqueous solution is introduced into the first urea synthesizing zone and the unreacted gases are totally circulated into the first urea synthesizing zone or into the heat recovering zone, or, after having been divided into two portions, one portion is introduced into the first urea synthesizing zone and the other into the heat recovering zone.

It is preferable to preheat liquid ammonia to be introduced into the first urea synthesizing zone to a temperature from 50°C to 150°C. As the heat source for preheating the liquid ammonia the condensate of high pressure steam, such as the condensate of the high pressure steam employed at the high pressure distillation column for separating unreacted ammonia and carbon dioxide, can be preferably employed. When the heat calories of said condensate are used for preheating liquid ammonia, the calories can be recovered in the heat recovering zone in the form of steam of high utility.

It is preferably to select a relatively low pressure for synthesizing urea within the permissible range, and therefore practically, it is selected within the range which is not much higher than the equilibrium pressure of the urea synthesis effluent at the outlet of the second urea synthesizing zone, or more preferably it is selected to be within the range not higher than 30 kg/cm² above said equilibrium pressure. Therefore, the pressure for synthesizing urea employed in the process of the present invention is preferably from about 120 to about 360 kg/cm² (gauge) when the molar ratio of $NH_3/CO_2$ is from about 3 to about 5 and the molar ratio of $H_2O/CO_2$ is from about 0 to about 1 and the temperature at the outlet of the second urea synthesizing zone is from about 160°C to about 220°C.

BRIEF DESCRIPTION OF THE DRAWINGS

In the drawings:

FIG. 1 is a flow diagram of one embodiment of the invention;

FIG. 2 is a flow diagram of a second embodiment of the invention;

FIG. 3 is a flow diagram of a third embodiment of the invention;

DESCRIPTION OF SPECIFIC EMBODIMENTS

Figure 4:
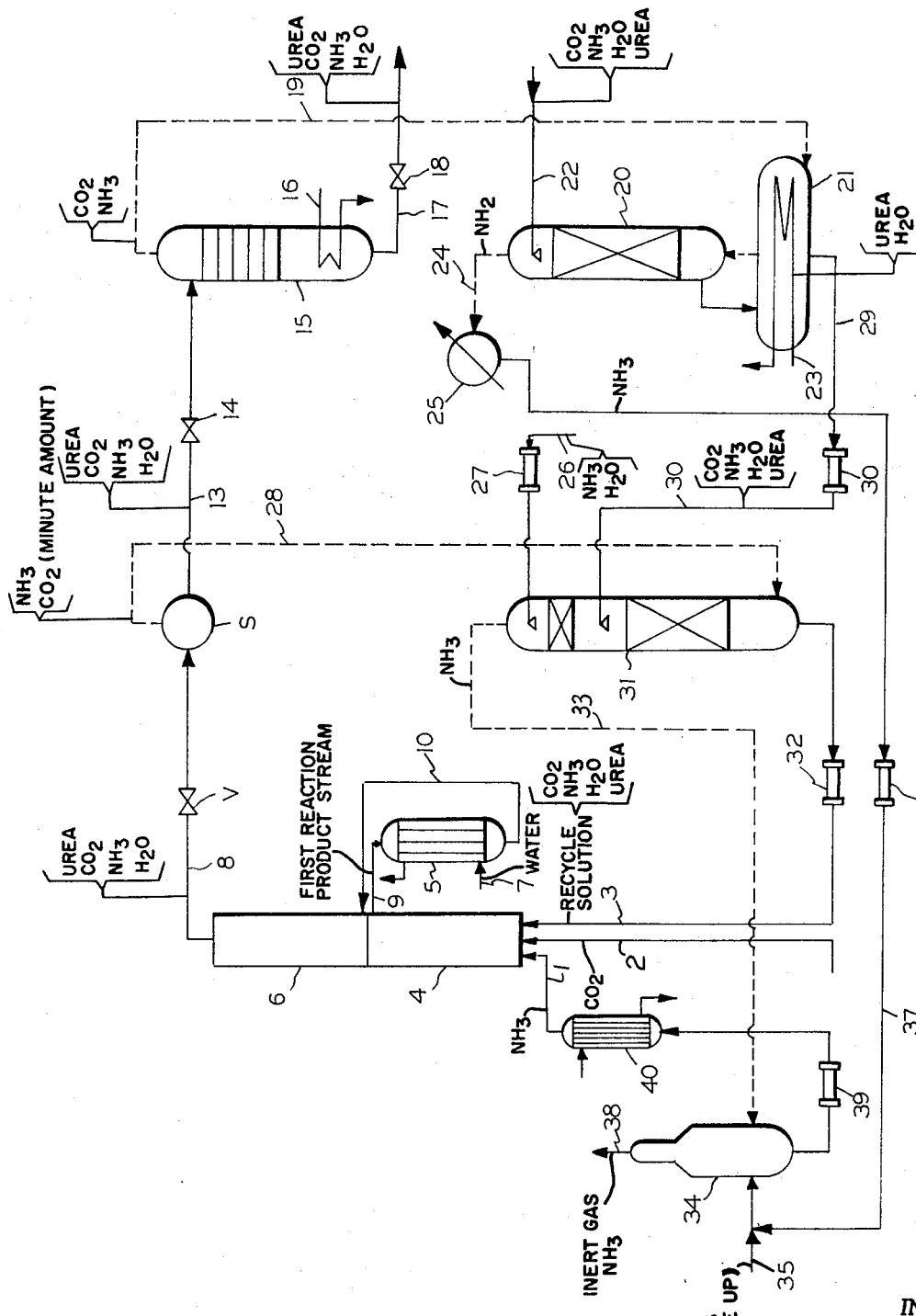
FIG. 4 is a flow diagram of the system used in Example 1 illustrating an embodiment of the invention.

The process of the present invention is concretely explained in accordance with the flow diagrams from FIG. 1 through FIG. 3. FIG. 1 and FIG. 2 show the case in which the total amount of ammonia and carbon dioxide are introduced into the first urea synthesizing zone. FIG. 1 shows the case in which the urea synthesizing zones and heat recovering zone are provided in one synthesis autoclave and FIG. 2 shows the case in which the first urea synthesizing zone and the second urea synthesizing zone are provided by forming divisions in the synthesis autoclave and the heat recovering zone is provided outside the synthesis autoclave.

In FIG. 1 and FIG. 2, a stream 1 of the raw material liquid ammonia having been preheated if necessary, a stream 2 of raw material carbon dioxide and a stream 3 of a recycle solution from the recovery of unreacted ammonia and carbon dioxide are introduced into a first urea synthesizing zone 4, and the streams are reacted under the pressure preferably ranging from about 150 to about 250 kg/cm² (gauge) at a temperature ranging from about 150°C to about 200°C. The molar ratio of the total ammonia and the total carbon dioxide introduced into the first urea synthesizing zone is preferably from about 2 to about 5.

A part of the ammonia and carbon dioxide introduced into the first urea synthesizing zone 4 relatively quickly rises within the synthesizing zone in the form of gas but the ammonium carbamate produced as a result of the reaction of ammonia and carbon dioxide is gradually converted into urea and at the outlet thereof, the conversion ratio reaches the range of about 30 to about 60 percent. The dwell time in the first urea synthesizing zone 4 is preferably from about 5 to about 15 minutes, and the temperature at the outlet of the first urea synthesizing autoclave is from about 150°C to about 200°C.

The stream of the reaction product (containing ammonia and carbon dioxide) coming out of the first urea synthesizing zone (the stream 9 in FIG. 2), is introduced into a heat recovering zone 5. In the heat recovery zone 5, the recovery of the excess heat calories is carried out while keeping the temperature approximately the same as in the first urea synthesizing zone and under substantially the same pressure.

The recovery of calories is carried out by the generation of steam of a pressure from about 2 to about 10 kg/cm² (gauge) through the indirect heat exchange between the stream of reaction product and a stream 7 of water introduced to the heat recovery zone 5. As a matter of fact, the recovery of the excess calories can be carried out in accordance with any appropriate method such as a method by which heat exchange is carried out indirectly with the final urea synthesis effluent under a reduced pressure, e.g. a pressure of about 0 to about 30 kg/cm² (gauge), to provide a heat source for decomposing unreacted ammonium carbamate contained in the urea synthesis effluent. Most of the gaseous ammonia and carbon dioxide contained in the stream of the reaction product are condensed in the heat recoverying zone 5.

The stream of the reaction product containing almost no gaseous ammonia and carbon dioxide (stream 10 in FIG. 2) is introduced into the second urea synthesizing zone 6, wherein it remains for about 5 to about 20 minutes and is subjected to further reaction at substantially the same temperature as its temperature in exiting from the heat recovery zone. Thus, the gaseous ammonia and carbon dioxide are substantially condensed and at the outlet of the urea synthesis autoclave, the conversion ratio almost reaches equilibrium. The produced urea synthesis effluent is discharged as stream 8 and is sent to the purifying and recovering steps.

FIG. 3 is a diagram showing the case in which a part of the raw materials ammonia and carbon dioxide is introduced directly into the heat recovery zone 5. The stream 1 of a part of the raw material ammonia having been preheated if necessary, the stream 2 of a part of the raw material carbon dioxide and the stream 3 of the recycle solution from the recovery of unreacted ammonia and carbon dioxide are introduced into the first urea synthesizing zone 4 and the streams are reacted under a pressure preferably ranging from about 150 to about 250 kg/cm$^2$ (gauge). The conversion ratio reaches the range of about 30 to about 60 percent, and the temperature reaches about 150° to about 200°C at the outlet of the first reaction zone 4.

The stream 9 of the reaction product containing uncondensed gaseous ammonia and carbon dioxide is introduced into the heat recovery zone 5, and at the same time the stream 11 of the remaining ammonia feed and the stream 12 of the remaining carbon dioxide feed are introduced thereto in such manner that the streams 11 and 12 are well mixed with the stream 9 of the reaction product. In regard to the amounts of the streams 11 and 12 introduced into the heat recovery zone 5, it is preferable to adjust the amount of these streams to contain around 20 to 40 percent by weight of the raw material ammonia and carbon dioxide. In the heat recovery zone 5, the excess heat calories are recovered in the same manner as in the cases of FIG. 1 and FIG. 2 at substantially the same temperature and under substantially the same pressure as in the first urea synthesizing zone (steam 7 is the same as described in FIGS. 1 and 2) and most of the gaseous ammonia and carbon dioxide are condensed.

The stream 10 of the reaction product from heat recovery zone 5 is introduced into the second urea synthesizing zone 6 and they are reacted in the same manner as in FIGS. 1 and 2. The produced urea synthesis effluent is discharged as stream 8 and is sent into the purifying and recovering steps.

The recycle solution introduced into the first urea synthesizing zone 4 functions as the absorbent of carbon dioxide and ammonia but in accordance with the method as shown in FIG. 3, a part of the raw material ammonia and carbon dioxide is introduced into the heat recovery zone 5 and therefore the amounts of gaseous ammonia and carbon dioxide in the first urea synthesizing zone 4 are reduced and the effective capacity of the synthesizing zone is increased. As a result, the conversion ratio in the first urea synthesizing zone 4 is increased by about 2 to about 5% when compared with the conversion ratio in the first urea synthesizing zone in FIGS. 1 and 2 and the pressure of the generated steam can be increased by about 1 to about 2 kg/cm$^2$. Moreover, in accordance with the process of FIG. 3, when the pressure of the generated steam can be lower, it is possible to use a synthesizing pressure of about 200 kg/cm$^2$ (gauge) when the ratio of excess ammonia to the stoichiometric amount is about 100 per cent and the temperature of the outlet of the urea synthesizing zone is adjusted to about 200°C, while in accordance with conventional methods wherein heat recovering is carried out before urea synthesis, it is necessary to adjust the synthesizing pressure to about 250 kg/cm$^2$ (gauge) to obtain approximately the same conversion ratio. In the processes of FIGS. 1 and 2, it is sufficient to adjust the synthesizing pressure to about 220 kg/cm$^2$ (gauge) to obtain the same conversion ratio.

The urea synthesis effluent 8 coming from the second urea synthesizing zone 6 is sent into the purifying and recovering steps and the unreacted ammonia and carbon dioxide are separated in the form of a gaseous mixture of ammonia and carbon dioxide. A part of the separated gaseous mixture or substantially all of it is recovered and is reused in the synthesis of urea.

The methods for purification and recovery can be any conventional methods. For example, the urea synthesis effluent 8 is subjected to a high pressure distillation under a gauge pressure of about 10 to about 30 kg/cm$^2$ to distill off a major portion of unreacted ammonium carbamate and excess ammonia in the form of a gaseous mixture and then the urea synthesis effluent from the high pressure distillation step is subjected to a low pressure distillation under a gauge pressure from about 0 to about 5 kg/cm$^2$ to distill off the remaining unreacted ammonium carbamate in the form of a gaseous mixture. The gaseous mixture from the low pressure distillation is absorbed into water, aqueous ammonia solution or aqueous urea solution to produce a low pressure absorbate. The pressure of the thus obtained low pressure absorbate is increased to absorb therein the gaseous mixture from the high pressure distillation and the resulting high pressure absorbate is circulated into the first urea synthesizing zone 4. Alternatively, the separated gaseous mixture is compressed directly or after having been condensed to remove moisture and then circulated into the first urea synthesizing zone 4 and/or the heat recovering zone 5. Moreover, the unreacted ammonia and carbon dioxide are separated from the urea synthesis effluent 8 by means of stripping with a part of the raw material carbon dioxide and the obtained gaseous mixture of ammonia and carbon dioxide can be circulated into the first urea synthesizing zone 4 and/or heat recovering zone 5.

However, the most preferable purifying and recovering process is as follows. The pressure of the urea synthesis effluent 8 from the second urea synthesizing zone 6 is reduced down to about 40 to about 100 kg/cm$^2$ (gauge) or more preferably from about 40 to about 80 kg/cm$^2$ (gauge), the urea synthesis effluent is introduced into a high pressure separator and a major part of the excess ammonia is separated at a temperature of about 130° to about 170°C. The pressure of the urea synthesis effluent from the high pressure separator is further reduced to about 10 to about 30 kg/cm$^2$ and is introduced into the high pressure distillation column to distill out major parts of the unreacted ammonium carbamate in the form of a gaseous mixture of ammonia and carbon dioxide. Then the pressure of the urea synthesis effluent from the high pressure distillation column is further reduced down to about 0 to about 5 kg/cm$^2$ (gauge) and is introduced into a low pressure distillation column wherein the remaining portion of the unreacted ammonium carbamate is distilled out in the form of a gaseous mixture of ammonia and carbon dioxide to obtain an aqueous solution of urea.

The thus obtained aqueous solution of urea is concentrated under vacuum and the concentrated aqueous solution of urea is subjected to crystallization to separate urea crystals from the mother liquor. The resulting urea crystals are melted in accordance with conventional methods and the produced melt is converted into droplets through a nozzle. The droplets are solidified by cooling to form prills. Alternatively, said aqueous solution of urea is concentrated to an anhydrous melt directly and the obtained melt is prilled as mentioned above.

On the other hand, the gaseous mixture from the low pressure distillation column is introduced into the low pressure absorption column and is absorbed in an absorbent to produce a low pressure absorbate. When the urea crystals are separated from the aqueous solution of urea the absorbent used is the resulting mother liquor and when it is concentrated in anhydrous solution the absorbent used is water or an aqueous ammonia solution. The pressure of the thus obtained low pressure absorbate is increased and is introduced into the second high pressure absorption column wherein the gaseous mixture from the high pressure distillation column is absorbed at a temperature from about 80°C to about 120°C to produce a second high pressure absorbate and the excess ammonia not absorbed is liquefied by cooling to recover liquid ammonia.

The second high pressure absorbate is introduced into the first high pressure absorption still wherein gaseous excess ammonia from the high pressure separator is washed with the second high pressure absorbate to absorb the minute amount of carbon dioxide accompanying said ammonia gas. The temperature of the first high pressure absorbate obtained is raised from about 120° to about 160°C by the heat of absorption. The first high pressure absorbate is circulated into the first urea synthesizing zone 4 as a recycle solution. The gaseous excess ammonia having been purged of carbon dioxide in the first high pressure absorption column is introduced into an ammonia condenser and is mixed along with the raw material liquid ammonia and the above-mentioned recovered liquid ammonia to condense the gaseous excess ammonia thereby forming liquid ammonia whose temperature is from about 80°C to about 115°C. The obtained liquid ammonia is further heated to a temperature from about 100°C to about 150°C with the condensate of high pressure steam used in the high pressure distillating column, and is introduced into the first urea synthesizing zone 4. The gaseous mixture distilled out in the low pressure distillation can be sent into a process for producing ammonia sulfate, ammonia phosphate and ammonium nitrate to utilize the ammonia contained therein.

In the above-mentioned purifying and recovering process, in place of the high pressure separation of a pressure of about 40 to about 100 kg/cm² (gauge), a part of excess ammonia and a part of unreacted ammonium carbamate, or preferably from about 20 to about 40 percent by weight of unreacted ammonium carbamate, can be distilled out in the form of a gaseous mixture of ammonia and carbon dioxide by means of high pressure distillation at a pressure from about 40 to about 100 kg/cm², or more preferably from about 40 to about 80 kg/cm² and at a temperature from about 140° to about 180°C. In this case, the gaseous mixture from the high pressure absorption column can be totally absorbed into the low pressure absorbate at a pressure of about 10 to about 30 kg/cm² (gauge). In order to maintain the temperature of the bottom of the first high pressure absorption column at about 120°C to about 170°C, the excess heat is removed by using the same as the heat source of a high pressure distillation from about 10 to about 30 kg/cm² or a low pressure distillation.

By adopting either of the above-mentioned two purifying and recovering processes, it is possible to obtain a urea synthesizing process with solution recycle according to which the consumption of steam is very small. In regard to the amount of the consumed steam, it is about 1 ton per 1 tone of urea and it is possible to recover about 0.3 ton of steam per 1 ton of urea in the heat recovery zone 5.

Figure 5:
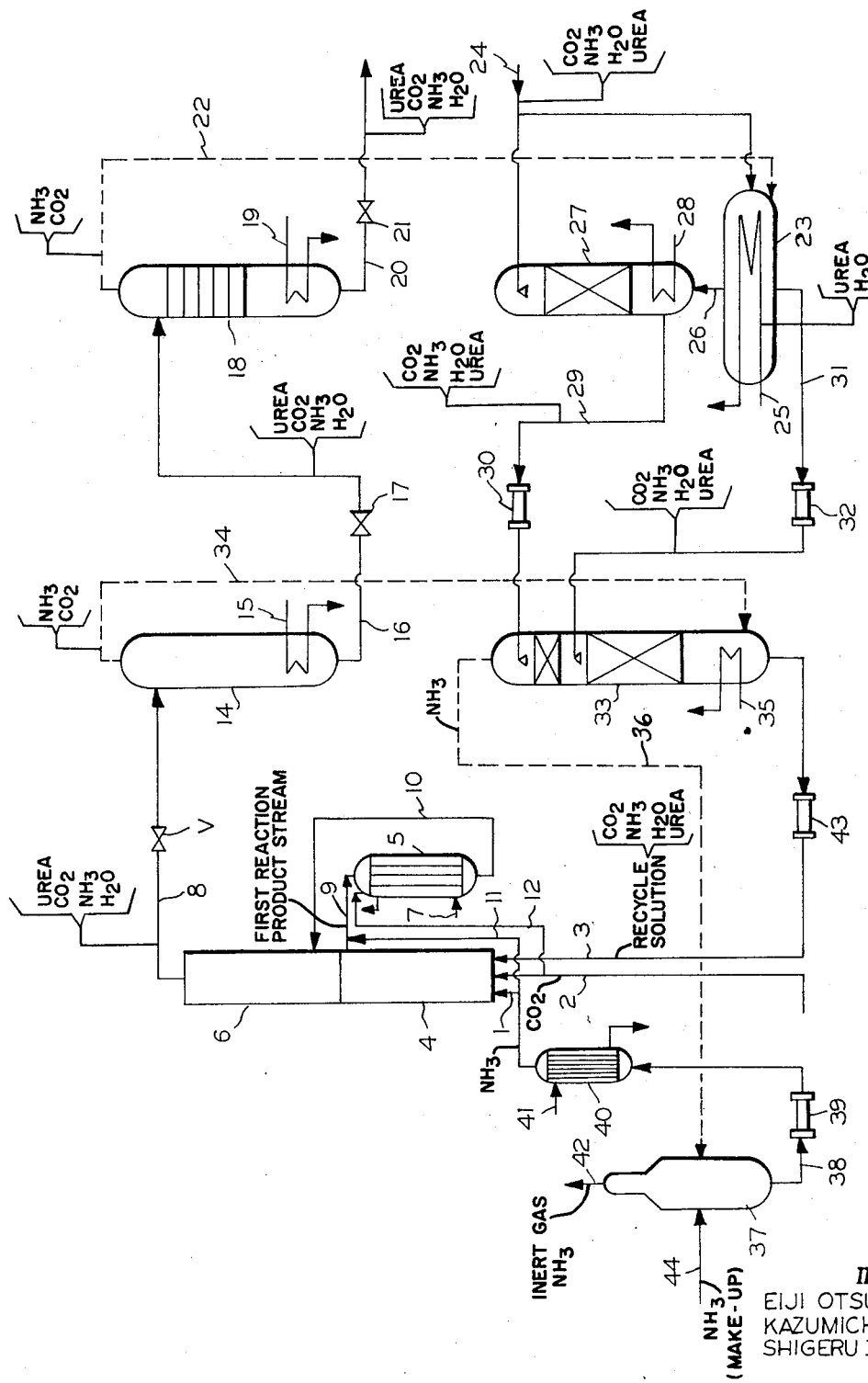
FIG. 5 is a flow diagram of the system used in Example 2 illustrating an embodiment of the invention.

The following are examples further illustrating the present invention in accordance with FIG. 4 and FIG. 5, but this invention is not to be restricted to the following concrete examples only.

EXAMPLE 1

In FIG. 4, 272 kg/hr of liquid ammonia steam 1 having been preheated to 110°C, 141.8 kg/hr of gaseous carbon dioxide stream 2 at a temperature of 130°C and a stream 3 of recycle solution composed of 25.4 kg/hr of urea, 87.8 kg/hr of ammonia, 82.8 kg/hr of carbon dioxide, and 51.2 kg/hr of water were charged into the bottom of the first synthesizing zone 4 of the urea synthesis autoclave kept at a gauge pressure of 230 kg/cm². The dwell time of the raw materials in the first synthesizing zone 4 was 11 minutes and the temperature of the outlet of the zone was 200°C. The conversion ratio reached 55%.

The stream 9 of the urea synthesis effluent containing uncondensed ammonia and carbon dioxide coming out of the first urea synthesizing zone 4 was introduced into the heat recovery zone 5. In the heat recovering zone 5, most of the carbon dioxide was condensed to produce ammonium carbamate and the heat generated in this case was recovered by turning the stream 7 of water introduced into the heat recovering zone 5 into steam under the pressure of 6 kg/cm² (gauge). The amount of the steam was 40 kg/hr.

The stream 10 of the urea synthesis effluent containing some uncondensed ammonia and carbon dioxide coming out of the heat recovery zone 5 was introduced into the second urea synthesizing zone 6. The dwell time of urea synthesis effluent in zone 6 was 10 minutes, and the temperature of the urea synthesis effluent 8 at the outlet was 200°C, and the total conversion ratio reached 71%.

The steam 8 of the urea synthesis effluent coming out of the second synthesizing zone 6 contained 236.2 kg/hr of urea, 240.4 kg/hr of ammonia, 70 kg/hr of carbon dioxide, and 114.4 kg/hr of water.

The pressure of the urea synthesis effluent was reduced through the pressure reducing valve V and said urea synthesis effluent was introduced into high pressure separator S which was adjusted to a pressure of 65 kg/cm² (gauge). A gaseous mixture composed of 100 kg/hr of ammonia, 13.8 kg/hr of carbon dioxide and 4.8 kg/hr of water was separated.

The pressure of the stream 13 of the solution composed of 236.2 kg/hr of urea, 140.4 kg/hr of ammonia, 56.2 kg/hr of carbon dioxide and 109.6 kg/hr of water coming from the separator S was reduced down to 17 kg/cm² (gauge) through the pressure reducing valve 14 and was introduced into a high pressure distillation column 15 having plates in the upper portion thereof, and a heater 16 on the lower portion thereof. The still temperature of the high pressure distillation column was kept at 165°C by means of the heater 16.

The pressure of the stream 17 of urea synthesis effluent composed of 228.6 kg/hr of urea, 22.4 kg/hr of ammonia, 7.4 kg/hr of carbon dioxide and 92.4 kg/hr of water, coming out of the still of the distillation column 15 was reduced through the pressure reducing valve 18 and passed to a low pressure distillation column (not shown). The urea synthesis effluent having the remaining ammonia and carbon dioxide perfectly removed in the low pressure distillation column (not shown), was concentrated and then subjected to vacuum crystallization to obtain 200 kg/hr of crystalline urea. A part of the raw material carbon dioxide, i.e., 5.2 kg/hr of the raw material carbon dioxide, was introduced from the bottom of the still in the low pressure distilling column to make the distillation of the unreacted substances easier. The separated urea mother liquor was sent into a low pressure absorption column (not shown) and the gas distilled out from the low pressure distillation column was absorbed therein to form a low pressure absorbate 22 composed of 25.4 kg/hr of urea, 23.2 kg/hr of ammonia, 14.6 kg/hr of carbon dioxide and 26 kg/hr of water.

The stream 19 of the mixture gas composed of 122.4 kg/hr of ammonia, 54.2 kg/hr of carbon dioxide and 14.8 kg/hr of water distilled from the high pressure distillation column 15 was introduced into a cooler 21 of a second high pressure absorption column 20 under almost the same pressure as the pressure of the high pressure distillation in column 15 and most of the carbon dioxide and a part of the ammonia were absorbed at 100°C with the stream 22 of the above-mentioned low pressure absorbate. (The temperature could be maintained at about 100°C by passing the aqueous solution of urea to be concentrated through the cooling tube 23 of cooler 21.) The absorbate 29 composed of 25.4 kg/hr of urea, 76 kg/hr of ammonia, 69 kg/hr of carbon dioxide, and 44 kg/hr of water were obtained. The stream 24 of ammonia gas coming out of the top of the second high pressure absorption still 20 was condensed in the second ammonia condenser 25 and was recovered as liquid ammonia in the amount of 52.8 kg/hr, and the uncondensed portion was washed with water and was recovered as an aqueous ammonia solution 26 composed of 16.8 kg/hr of ammonia and 2.4 kg/hr of water. The pressure of the stream 26 of the aqueous ammonia solution was increased by means of the pump 27 and was sent into the upper portion of the first high pressure absorption column 31 for collecting minute amounts of carbon dioxide.

The stream 28 of the gaseous mixture from the high pressure separator S was introduced into the lower portion of the high pressure absorption column 31, the stream 29 of the absorbate was introduced into the middle portion of the high pressure absorption column 31 by means of the pump 30, and most of the carbon dioxide and a part of the ammonia contained in the stream 28 were absorbed therein. The ammonia gas containing a minute amount of carbon dioxide was washed with an aqueous ammonia solution 26 as mentioned above to remove the whole of carbon dioxide and was removed as pure ammonia gas from the top of the absorption column 31. Meanwhile, the temperature of the bottom of the absorption column 31 reached 160°C. The pressure of the absorption liquid from the bottom of the first high pressure absorption column 31 was increased by means of the pump 32 and was recirculated into the first synthesizing zone 4 of the urea synthesis autoclave as the stream 3 of the recycle solution.

The stream 33 of 105.0 kg/hr of ammonia gas having a temperature of 105°C and coming from the first high pressure absorption column 31 was introduced into the first ammonia condenser 34, is mixed with the stream 35 of 114.8 kg/hr of the raw material liquid ammonia introduced simultaneously and the stream 37 of 52.8 kg/hr of liquid ammonia recovered in the above-mentioned second ammonia condenser 25 and was condensed. The obtained liquid ammonia was at a temperature of 100°C. The stream 38 of 0.6 kg/hr of ammonia gas withdrawn along with the inert gas from the first ammonia condenser 34 was recovered by washing the gas with water.

The liquid ammonia obtained at the first ammonia condenser 34 was compressed with the pump 39 and was introduced into the ammonia preheater 40 to preheater to 110°C with a stream 41 of the condensate of high pressure steam and was then introduced into the first synthesizing zone 4 of the urea synthesis autoclave.

On the other hand, when the raw material ammonia, carbon dioxide and the recycle solution were directly introduced into a heat recovery zone without passing through the first synthesizing zone 4 the amount of the generated steam was 30 kg/hr and the conversion ratio was reduced to 65 percent under the same synthesizing conditions.

EXAMPLE 2

In FIG. 5, 194 kg/hr of the flow 1 of liquid ammonia having been preheated at 125°C, 91.8 kg/hr of the stream 2 of gaseous carbon dioxide having the temperature of 130°C and the stream 3 of recycle solution composed of 25.4 kg/hr of urea, 107.8 kg/hr of ammonia, 82.8 kg/hr of carbon dioxide and 51.2 kg/hr of water were sent to the bottom portion of a first synthesizing zone 4 of a urea synthesis autoclave kept under the gage pressure of 200 kg/cm$^2$. The dwell time in the first synthesizing zone 4 was 11 minutes and the temperature at the outlet of the autoclave was 200°C. The conversion ratio reached 60 percent.

The stream 9 of the urea synthesis effluent coming out of the first synthesizing zone 4 was mixed with the stream 12 of 50 kg/hr of gaseous carbon dioxide of 130°C and the stream 11 of 58 kg/hr of liquid ammonia having been preheated at 125°C and the mixture was introduced into the heat recovering zone 5. Most of the gaseous carbon dioxide was condensed at 200°C in the urea synthesis effluent 9 in the heat recovery zone 5 to produce ammonium carbamate and the heat which was generated when ammonium carbamate was produced, was recovered by making the stream 7 of water introduced into the heat recovering zone 5 into steam at a gauge pressure of 7 kg/cm$^2$ in an amount of 50 kg/hr. The stream 10 of urea synthesis effluent containing a small amount of uncondensed ammonia and carbon dioxide coming out of the heat recovering zone 5 was introduced into the second synthesizing zone 6 of the urea synthesis autoclave. The dwell time of the urea synthesis effluent was 9 minutes and the temperature of the urea synthesis effluent 8 at the outlet of the second urea synthesizing zone 6 of the urea synthesis autoclave was 200°C and the conversion ratio reached 71 percent.

The stream 8 of urea synthesis effluent coming out of the second urea synthesizing zone 6 contained 236.2 kg/hr of urea, 240.4 kg/hr of ammonia, 70 kg/hr of carbon dioxide and 114.4 kg/hr of water. The pressure of the stream 8 of the urea synthesis effluent was reduced through the pressure reducing valve V and was sent into a first high pressure distillation column 14 kept under the gauge pressure of 80 kg/cm² and the temperature of the solution was kept at 170°C by means of the heater 15 provided at the bottom of the column and a mixture of 152.8 kg/hr of ammonia, 21.2 kg/hr of carbon dioxide and 6.2 kg/hr of water was distilled out from the top of the column.

The pressure of the stream 16 composed of 231.8 kg/hr of urea, 90.2 kg/hr of ammonia, 52 kg/hr of carbon dioxide and 106.8 kg/hr of water coming out of the bottom of the column, was reduced through valve 17 and was sent into a second high pressure distillation column 18 having plates in the upper portion thereof and a heater 19 at the lower portion thereof. The temperature of the solution at the bottom of the still was kept at 165°C by the heater. The pressure of the stream 20 of urea synthesis effluent composed of 228.6 kg/hr of urea, 22.4 kg/hr of ammonia, 7.4 kg/hr of carbon dioxide and 90.4 kg/hr of water was reduced through the pressure reducing valve 21 and the remaining ammonia and carbon dioxide was perfectly removed in a low pressure distillation column (not shown). Two-hundred kg/hr of crystalline urea was obtained by concentrating the resulting urea solution and subjecting the concentrated urea solution to vacuum crystallization. A part of the raw material carbon dioxide, i.e., 5.2 kg/hr of the raw material carbon dioxide, was introduced from the bottom of the still of the low pressure distillation column to make the distillation of unreacted raw materials easier.

The urea mother liquor separated in the crystallization was sent into a low pressure absorption column (not shown) to absorb therein the gas distilled out of the low pressure distillation column and a low pressure absorbate 24 composed of 25.4 kg/hr of urea, 23.2 kg/hr of ammonia, 14.6 kg/hr of carbon dioxide and 26 kg/hr of water was obtained.

The stream 22 of the gas mixture composed of 15.4 kg/hr of water, 47.0 kg/hr of carbon dioxide and 69.6 kg/hr of ammonia distilled out of the second high pressure distillation column 18 was introduced into the first absorption zone 23 of a second high pressure absorption column 27 under almost the same pressure as that of the second high pressure distillation column 18, and most of carbon dioxide and a part of the ammonia contained in the mixture were absorbed at 100°C with about 80 percent of the stream 24 of the low pressure absorbate which was simultaneously introduced. (The temperature could be retained at 100°C by passing the aqueous solution of urea to be concentrated through the cooling tube 25.) The absorbate 31 composed of 20.4 kg/hr of urea, 60.6 kg/hr of ammonia, 49.4 kg/hr of carbon dioxide and 33.2 kg/hr of water was obtained.

The stream 26 of the gas mixture which was not absorbed in the first absorption zone 23 was introduced into the second absorption zone 27 of the second high pressure absorption column and was perfectly absorbed at 60°C (water-cooled by means of the cooling tube 28) into 20 percent of the stream 24 of the low pressure absorbate which was simultaneously introduced and an absorbate composed of 5.0 kg/hr of urea, 32.2 kg/hr of ammonia, 12.2 kg/hr of carbon dioxide and 8.2 kg/hr of water was obtained. The pressure of the stream 29 of the absorbate coming from the second absorption zone 27 of the second absorption still, was increased by the pump 30, and the stream 29 was introduced into the upper portion of the first high pressure absorption column 33 operated under the same pressure as the first high pressure distillation column 14. The pressure of the stream 31 of the absorbate coming from the first absorption zone 23 was increased by the pump 32 and the stream 31 was sent into the middle portion of the first high pressure distillation column 33 to absorb therein a part of the ammonia and all of the carbon dioxide of the stream 34 of the gas mixture coming from the first high pressure distillation column 14 and introduced into the lower portion of the first high pressure absorption column 33. In this case, the temperature of the absorbate at the bottom of the column was increased up to 150°C because of the heat of absorption and 20 kg/hr of steam under the gauge pressure of 2 kg/hr was recovered from the cooling tube 35.

In order to collect a minute amount of carbon dioxide contained in ammonia gas coming from the top of the first absorption column 33, 3.6 kg/hr of water was poured into the upper portion of the column to wash the ammonia gas. The stream 36 of 137.8 kg/hr of ammonia gas of a temperature of 115°C having been separated from the top of the still was sent into the ammonia condenser 37 under almost the same pressure, was mixed along with 114.8 kg/hr of raw material liquid ammonia stream 44 of a room temperature and was condensed under the pressure of 80 kg/cm² (gauge). Two-hundred fifty-two kg/hr of liquid ammonia of a temperature of 112°C was obtained. The pressure of the stream 38 of the liquid ammonia was increased by the pump 39 to 210 kg/cm² (gauge). Then the stream 38 of the liquid ammonia was preheated at 125°C in the ammonia preheater 40 by the stream 41 of the condensate of high pressure steam used in the heater 15 of the first high pressure distillation column 15 and, as described before, it was divided into two portions which were sent into the first synthesizing zone of urea synthesis autoclave 4 and heat recovery zone 5 as the stream 1 and the stream 11 respectively. The stream 42 of 0.6 kg/hr of ammonia gas withdrawn along with the inert gas from the ammonia condenser 37 was washed with water and was recovered.

The pressure of the absorbate from the bottom of the still of the first high pressure absorption column 33 was increased by the pump 43 and it was sent into the first synthesizing zone 4 as the stream 3 of the recycle solution as mentioned above.

WHAT IS CLAIMED IS:

1. A process for synthesizing urea comprising
    1. reacting ammonia and carbon dioxide at urea-forming temperature and pressure in a first urea synthesizing zone without removing heat therefrom to form a first reaction product stream containing urea, water, unreacted ammonium carbamate, gaseous ammonia and gaseous carbon dioxide, the dwelling time in said first urea synthesizing zone being from about 5 to about 15 minutes, 2. removing heat while maintaining the temperature substantially the same as that of the first urea synthesizing zone from said first stream in a heat recovery zone to condense gaseous ammonia and carbon dioxide therein and 3. reacting said condensed ammonia and carbon dioxide in said first stream in a second urea synthesizing zone to form a second reaction product stream containing additional urea, water and unreacted ammonium carbamate.

2. A process as claimed in claim 1 wherein 50 to 90 per cent by weight of the make-up ammonia and carbon dioxide is fed into said first urea synthesizing zone and the remaining portion thereof is mixed with said first reaction product stream.

3. A process as claimed in claim 1 wherein said reacted ammonium carbamate contained in said second stream is separated by distillation in the form of a gaseous mixture of ammonia and carbon dioxide, at least a part of said gaseous mixture is absorbed in an absorbent to form an absorbate containing ammonium carbamate, and said absorbate is recirculated to said first urea synthesizing zone.

4. A process as claimed in claim 1 wherein said unreacted ammonium carbamate contained in said second reaction product stream is separated by distillation in the form of a gaseous mixture of ammonia and carbon dioxide, at least a part of said gaseous mixture is absorbed in an absorbent to form an absorbate containing ammonium carbamate, and said absorbate is mixed with said first reaction product stream.

5. A process as claimed in claim 1 wherein said ammonia is preheated to a temperature of 50° to 150°C prior to being introduced into said first urea synthesizing zone.

6. A process of claimed in claim 1 wherein said urea-forming pressure is a pressure ranging from a pressure equal to the equilibrium pressure of said second reaction product stream at the outlet of said second urea synthesizing zone to a pressure of 30 kg/cm² higher than said equilibrium pressure.

7. A process as claimed in claim 1 wherein said heat removed in step 2 is recovered by indirect heat exchange between said first reaction product stream and a stream of water to generate steam.

8. A urea synthesizing process with solution recycle comprising 1. reacting carbon dioxide and a stoichimetrically excess of ammonia in a first urea synthesizing zone to produce a first reaction product stream containing urea, water, unreacted ammonium carbamate, gaseous ammonia and gaseous carbon dioxide, 2. removing heat from said first reaction product stream in a heat recovery zone to recover excess heat of reaction while maintaining the temperature substantially the same as that of the first urea synthesizing zone to condense most of said gaseous ammonia and said gaseous carbon dioxide, 3. further reacting said first reaction product stream from said heat recovery zone in a second urea synthesizing zone to form a urea synthesis effluent containing urea, excess ammonia, unreacted carbon dioxide, unreacted ammonium carbamate and water, 4. reducing the pressure of said urea synthesis effluent to a pressure ranging from about 40 to about 100 kg/cm² (gauge) to separate therefrom most of the excess ammonia in the form of gaseous ammonia containing up to minute amounts of carbon dioxide, 5. subjecting said urea synthesis effluent depleted of excess ammonia to a high pressure distillation under a pressure from about 10 to about 30 kg/cm² (guage) to distill out most of unreacted ammonium carbamate in the form of a gaseous mixture of ammonia and carbon dioxide, 6. treating said gaseous mixture from said high pressure distillation in an absorbent selected from the group consisting of water, an aqueous solution of ammonia, an aqueous solution of urea, an aqueous solution of ammonium carbamate and an aqueous solution of ammonium carbamate and urea to form a first absorbate, 7. increasing the pressure of said first absorbate, 8. absorbing in said first absorbate said minute amounts of carbon dioxide in said gaseous ammonia from the step 4 thereby forming a gaseous ammonia free of carbon dioxide and a second absorbate, 9. recirculating said second absorbate to said first urea synthesizing zone, 10. condensing said gaseous ammonia free of carbon dioxide by mixing the same along with raw material liquid ammonia to produce high temperature liquid ammonia, and 11. recirculating the thus obtained liquid ammonia to said first urea synthesizing zone.

9. A process as claimed in claim 8 wherein 12. said urea synthesis effluent after said high pressure distillation step 5 is subjected to a low pressure distillation at a gauge pressure of about 0 to about 5 kg/cm² to distill out substantially all remaining unreacted ammonium carbamate in the form of a gaseous mixture of ammonia and carbon dioxide and result in an aqueous solution of urea, 13. concentrating the resulting aqueous solution of urea, 14. crystallizing urea from the concentrated solution to form a mother liquor and urea crystals, 15. absorbing the gaseous mixture from said low pressure distillation in said mother liquor to form an absorbate, and 16. absorbing said gaseous mixture from said high pressure distillation in the resulting absorbate.

10. A process as claimed in claim 9 wherein said concentrating step is conducted by evaporation employing the heat of absorption generated in absorbing step 16.

11. A urea synthesizing process with solution recycle comprising 1. reacting carbon dioxide and stoichiometrically excess ammonia in a first urea synthesizing zone to produce a first stream of reaction product containing urea, water, unreacted ammonium carbamate, gaseous ammonia and gaseous carbon dioxide,
2. introducing said first stream into a heat recovering zone to recover excess heat of reaction while maintaining the temperature substantially the same as that of the first urea synthesizing zone and thereby condense most of said gaseous ammonia and said gaseous carbon dioxide,
3. introducing said stream from the heat recovering zone into a second urea synthesizing zone for further reaction to form a urea synthesis effluent containing urea, excess ammonia, unreacted carbon dioxide, unreacted ammonium carbamate and water,
4. reducing the pressure of the resulting urea synthesis effluent from said second urea synthesizing zone to a pressure ranging from about 40 to about 100 kg/cm (gauge),
5. subjecting said urea synthesis effluent having pressure reduced to a first high pressure distillation under a pressure from about 40 to about 100 kg/cm$^2$ (gauge) to distill out excess ammonia and a part of unreacted ammonium carbamate in the form of a gaseous mixture of ammonia and carbon dioxide,
6. subjecting the effluent from the first high pressure distillation to a second high pressure distillation under a pressure from about 10 to about 30 kg/cm$^2$ (gauge) to distill out most of the remaining unreacted ammonium carbamate in the form of a gaseous mixture of ammonia and carbon dioxide,
7. absorbing said gaseous mixture from the second high pressure distillation in an absorbent selected from the group consisting of water, an aqueous solution of ammonia, an aqueous solution of urea, an aqueous solution of ammonium carbamate and an aqueous solution of ammonium carbamate and urea, to form a first absorbate,
8. increasing the pressure of said first absorbate,
9. absorbing in said first absorbate carbon dioxide and a part of ammonia contained in said gaseous mixture from the first high pressure distillation thereby obtaining a gaseous ammonia free of carbon dioxide and a second absorbate,
10. recirculating said second absorbate to said first urea synthesizing zone,
11. condensing said gaseous ammonia free of carbon dioxide by mixing the same into raw material liquid ammonia to produce high temperature liquid ammonia, and
12. recirculating the thus obtained liquid ammonia to said first urea synthesizing zone.

12. A process as claimed in claim 11 wherein
13. the urea synthesis effluent from said second high pressure distillation is subjected to a low pressure distillation at a gauge pressure of about 0 to about 5 kg/cm$^2$ to distill out substantially all of the remaining unreacted ammonium carbamate in the form of a gaseous mixture of ammonia and carbon dioxide,
14. the resulting aqueous solution of urea is subjected to concentration and then to crystallization to separate a mother liquor from urea crystals,
15. the gaseous mixture from said low pressure distillation is absorbed in said mother liquor and
16. the resulting absorbate is used for absorbing said gaseous mixture from said second high pressure distillation.

13. A process as claimed in claim 12 wherein said concentration is conducted by evaporation employing the heat of absorption generated in absorbing said gaseous mixture from said second high pressure distillation in said absorbate in step 7.

14. A process as claimed in claim 1 wherein said heat removed in step 2. is recovered by indirect heat exchange between said first reaction product stream and said second reaction product under a reduced pressure.

* * * * *